J. Keesey's Impd. Coupling.

71884

PATENTED
DEC 10 1867

Witnesses.

John Keesey

United States Patent Office.

JOHN KEESEY, OF CHESTER, PENNSYLVANIA.

Letters Patent No. 71,884, dated December 10, 1867.

IMPROVEMENT IN SHAFT-COUPLING.

The Schedule referred to in these Letters Patent and making part of the same.

TO ALL WHOM IT MAY CONCERN:

Be it known that I, JOHN KEESEY, of Chester, in the county of Delaware, and State of Pennsylvania, have invented a new and useful Improvement in Shaft and other Couplings, of which the following is a full, clear, and exact description, reference being had to the accompanying drawing, forming part of this specification, and in which—

Figure 1:
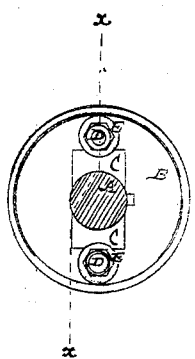
Figure 2:
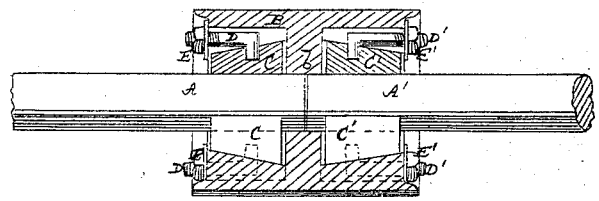

Figure 1 represents an end view of my improved coupling as applied to connecting two lengths of shafting, and Figure 2 an irregular longitudinal section of the same, taken as indicated by the blue dotted line $x\ x$ in fig. 1.

Similar letters of reference indicate corresponding parts.

This, my invention, is applicable, among other purposes, to coupling shafting made in separate lengths or sections lying in the same axial line; also to coupling or hanging wheels, drums, or pulleys, and screw-propellers on their shafts; and the invention consists in a certain combination of wedges, bolts, and shell, box, or hub-piece, whereby increased facility is afforded for establishing and disconnecting the coupling or connection, and other advantages obtained.

Referring to the accompanying drawing, A A' represent two lengths of shafting, which are shown united by my improved coupling, that is formed in part of a box, hub, or shell, B, geared or united by groove and feather or key, so as to turn with said shafts, and that is provided or fitted on the inside with sliding wedge-shaped blocks C C' arranged in pairs, so as to bear on either shaft on opposite sides of it, and the one pair of the one shaft having a reverse inclination to the adjacent pair of the other shaft. These blocks C C' have their bevel on their back edges or faces that lie against inclined ways or surfaces in the shell or box, while their front faces are hollowed or formed to hug the shafts. D D' are bolts passing through slots or holes in the shell B, and hooking into or gearing with the wedge-shaped blocks C C', and fitted on their exterior ends with nuts E E', that, accordingly as they are turned to the right or to the left, serve to slacken or tighten up the gripe of the blocks C C' on the shafts, and so to release or establish the coupling, the sliding movement of the blocks being in direction of the length of the shafts, and, by the gear of them with the shell and of the latter with the shafts, being restrained from turning excepting with the shafts. The shell B is shown as supported on the shafts A A' at their ends by or through a partition, b, acting as a hub. The same arrangement or means, it will be seen, is or are equally applicable to securing wheels, drums, pulleys, or other devices on either a single or divided shaft, it only being necessary to suppose the shell B, the hub of the pulley, or other device hung on the shaft, or it may constitute a drum or pulley itself, whether used in addition to couple a divided shaft, or as arranged on a whole one.

By this, my improved coupling or means for establishing connection of parts, as described, shafts can be readily uncoupled, locking-keys are dispensed with, and as applied to a pulley, for instance, it affords every facility for readily moving the pulley from one place to another on the shaft, and, as the wedges act by pairs, in reverse directions, for centring or holding it in its required position on the shaft. In such a coupling there need be comparatively little fitting and finishing, and couplings so formed be forwarded ready for use or application, on the diameter of the shaft being known.

What is here claimed, and desired to be secured by Letters Patent, is—

The combination of the box, hub, or shell B, reverse wedge-shaped blocks C C', and bolts D D', with their nuts E E', or the equivalents of these devices, arranged for operation together, substantially as and for the purposes herein set forth.

JOHN KEESEY.

Witnesses:
J. W. KENWORTHY,
A. S. GELSTON.